US010939482B2

(12) United States Patent
Windorfer

(10) Patent No.: US 10,939,482 B2
(45) Date of Patent: Mar. 2, 2021

(54) METHOD FOR CONNECTING A HOUSEHOLD APPLIANCE TO A WIRELESS HOME NETWORK

(71) Applicant: Vorwerk & Co. Interholding GmbH, Wuppertal (DE)

(72) Inventor: Harald Windorfer, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 144 days.

(21) Appl. No.: 15/943,862

(22) Filed: Apr. 3, 2018

(65) Prior Publication Data

US 2018/0288817 A1 Oct. 4, 2018

(30) Foreign Application Priority Data

Apr. 3, 2017 (DE) ..................... 10 2017 107 087.7

(51) Int. Cl.
*G06F 15/16* (2006.01)
*H04W 76/11* (2018.01)
(Continued)

(52) U.S. Cl.
CPC ........... *H04W 76/11* (2018.02); *G06K 7/1095* (2013.01); *H04L 12/2807* (2013.01);
(Continued)

(58) Field of Classification Search
CPC ..... H04L 12/2807; H04W 76/11; H04W 4/33; G06K 7/1095; H04N 19/159; H04N 19/157
(Continued)

(56) References Cited

U.S. PATENT DOCUMENTS

2013/0050259 A1\* 2/2013 Ahn ...................... G06F 3/1454
345/633
2014/0013100 A1\* 1/2014 Menzel ............ H04N 21/43637
713/150
(Continued)

FOREIGN PATENT DOCUMENTS

FR 2 938 393 B1 7/2011

OTHER PUBLICATIONS

J. Montalvo, J. A. Torrijos, J. Xia and Y. Ye, "Energy efficiency in PON home network scenarios with network enhanced Residential Gateways," 2013 10th IEEE International Conference on Networking, Sensing and Control (ICNSC), Evry, 2013, pp. 141-145.\*
(Continued)

*Primary Examiner* — Oscar A Louie
*Assistant Examiner* — Messeret F Gebre
(74) *Attorney, Agent, or Firm* — Collard & Roe, P.C.

(57) ABSTRACT

The invention pertains to a method for connecting a household appliance (1) to a wireless home network (2), wherein network access information is transmitted from a user terminal (3) to the household appliance (1) by means of an optical code (4) displayed on the user terminal (3), and wherein the household appliance (1) logs on to the wireless home network (2) by utilizing the received network access information. In order to ensure that the optical code (4) is suitable for the household appliance (1), it is proposed that an application identification of an application, which generates the optical code (4) and is installed on the user terminal (3), is transmitted in the optical code (4).

7 Claims, 3 Drawing Sheets

(51) Int. Cl.
   *H04L 29/08*   (2006.01)
   *H04W 4/33*    (2018.01)
   *G06K 7/10*    (2006.01)
   *H04L 12/28*   (2006.01)
   *H04L 12/24*   (2006.01)

(52) U.S. Cl.
   CPC ............... *H04L 67/34* (2013.01); *H04W 4/33* (2018.02); *H04L 41/084* (2013.01); *H04L 41/0806* (2013.01); *H04L 41/0869* (2013.01); *H04L 2012/2841* (2013.01)

(58) Field of Classification Search
   USPC ........................................................ 709/228
   See application file for complete search history.

(56) References Cited

U.S. PATENT DOCUMENTS

| | | | | |
|---|---|---|---|---|
| 2014/0087661 | A1* | 3/2014 | Kim | H04B 5/0025 455/41.1 |
| 2014/0282924 | A1* | 9/2014 | Singhal | H04L 63/0853 726/5 |
| 2016/0043895 | A1* | 2/2016 | Hwang | H04M 7/1295 370/338 |
| 2016/0121487 | A1* | 5/2016 | Mohan | H04L 67/34 700/248 |
| 2016/0227388 | A1* | 8/2016 | Goto | H04W 4/185 |
| 2017/0041309 | A1* | 2/2017 | Ekambaram | G06F 21/64 |
| 2018/0225444 | A1* | 8/2018 | Frenz | H04L 9/0841 |

OTHER PUBLICATIONS

Kim, D. S., Cho, G. Y., Kwon, W. H., Kwan, Y. I., & Kim, Y. H. (2002). Home network message specification for white goods and its applications. IEEE Transactions on Consumer Electronics, 48(1), 1-9.*

R. Mortier et al., "Control and understanding: Owning your home network," 2012 Fourth International Conference on Communication Systems and Networks (COMSNETS 2012), Bangalore, 2012, pp. 1-10.*

* cited by examiner

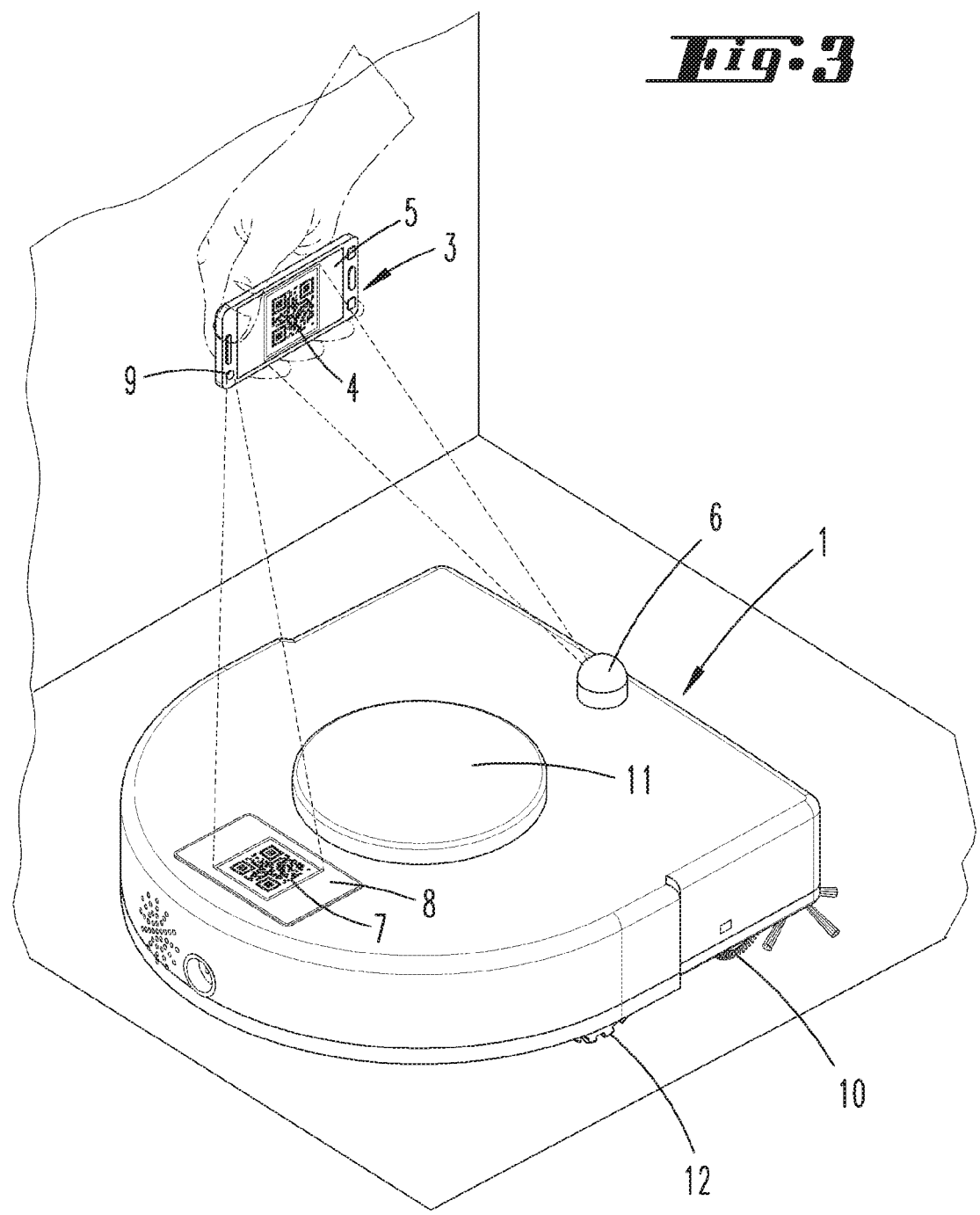

METHOD FOR CONNECTING A HOUSEHOLD APPLIANCE TO A WIRELESS HOME NETWORK

CROSS REFERENCE TO RELATED APPLICATIONS

Applicant claims priority under 35 U.S.C. § 119 of German Application No. 10 2017 107 087.7 filed on Apr. 3, 2017, the disclosure of which is incorporated by reference.

TECHNICAL FIELD

The application pertains to a method for connecting a household appliance to a wireless home network, wherein network access information is transmitted from a user terminal to the household appliance by means of an optical code displayed on the user terminal, and wherein the household appliance logs on to the wireless home network by utilizing the received network access information.

PRIOR ART

Methods of the above-described type are known from the prior art. These methods particularly serve for connecting a device, which does not feature its own manual input interface, to a home network. In order to connect the device, another device transmits the network access information required for logging on to the home network to the device.

For example, patent FR 2 938 393 B1 discloses a method for connecting an entertainment robot to a router. The entertainment robot features a camera for scanning a QR code that is displayed on the screen of a computer and contains an identification code of the router. The entertainment robot can then log on to the network of the router by means of its identification code.

In this case, it is disadvantageous that the device to be connected cannot distinguish whether an optical code scanned thereby is suitable for this device. This can result, for example, in malfunctions or other error conditions of the device, particularly in malfunctions or error conditions that prevent or at least complicate a proper connection of the device to the home network.

SUMMARY OF THE INVENTION

Based on the above-described prior art, the invention therefore aims to develop an enhanced method for connecting a household appliance to a home network, particularly with respect to a flawless function of the household appliance.

In order to attain the aforementioned objective, it is proposed that an application identification of an application, which generates the optical code and is installed on the user terminal, is transmitted in the optical code.

According to the invention, the transmitted optical code now contains an identification that identifies the respectively used application installed on the user terminal. Based on this application identification, an evaluation device of the household appliance can determine that the optical code is suitable for this household appliance. In case the household appliance contains optical codes of multiple user terminals or a user terminal with an outdated version of the application, at least one of the optical codes can be respectively identified as valid or invalid. Consequently, an outdated application, for example, cannot lead to a malfunction or failure of the registration process for logging on the household appliance to the home network.

It is proposed that an evaluation device of the household appliance compares the application identification contained in the optical code with a valid application identification stored in the household appliance and releases the network access information contained in the optical code for logging on to the home network if the application identifications match. One or more valid application identifications are stored in the household appliance and can be compared with an application identification contained in the received optical code. The user terminal only uses the network access information contained in the code for logging on to the home network if it is determined that the application identifications match.

It is proposed that the information contained in the optical code is not used by the household appliance if the application identification does not match or is missing. If it is determined that the application identification contained in the code and the application identification stored in the household appliance do not match or that the transmitted code does not contain any application identification, the optical code is ignored by the household appliance and no longer used, i.e. an evaluation device of the household appliance does not extract the network access information from the optical code and/or process and/or transmit this network access information to a router or access point of the home network.

It is particularly proposed that the optical code is a two-dimensional code displayed on a screen of the user terminal. The optical code may particularly consist of a QR code(R) (Quick Response code). The two-dimensional code displayed on the screen of the user terminal may advantageously consist of a black-and-white pattern that is realized in the form of a barcode or a QR code. The pattern contains information in encoded form, wherein this information concerns, among other things, also the network access to the home network. The optical code is preferably displayed on the screen in the form of a still image, but it would also be possible that the optical code changes over a certain period of time, for example in the sense of individual successive images, in the form of a video or the like. Furthermore, it is naturally also possible to provide color coding in the optical code. The household appliance or an evaluation device of the household appliance respectively features means for decoding the optical code and for extracting the network access information contained therein, wherein said decoding means correspond to the type of optical code used.

It is proposed that the optical code is scanned by means of an image sensor of the household appliance. For this purpose, the image sensor of the household appliance is placed in front of the screen of the user terminal in such a way that a scanning range of the image sensor contains the surface of the screen. However, the user of the household appliance usually places the user terminal, for example a mobile device such as a mobile telephone, a laptop, a tablet computer or the like, in front of the image sensor of the household appliance such that the image sensor can detect the optical code displayed on the screen of the user terminal. The image sensor of the household appliance is preferably a camera or a camera chip that is mounted on the housing of the household appliance. Alternatively, it would also be possible that the image sensor is arranged externally of the household appliance and transmits the scanned data to an evaluation device thereof.

It is furthermore proposed that the user selects an SSID of the household appliance and/or specifies a password for the household appliance and/or specifies a name for the household appliance by means of the application installed on the user terminal. For example, the user can press a key of the user terminal or, for example, an area of a touchscreen displayed in the form of a key, which respectively contains the function "add household appliance." After this physical or virtual keystroke, an input mask opens on the screen of the user terminal, in which the user can enter an SSID, an associated password and/or a name for the household appliance. The aforementioned selection or inputs may be realized in a common input mask or alternatively in multiple masks. An optical code containing the aforementioned information, the network access information and the application identification is then displayed on the screen of the user terminal upon confirmation of the input, for example, by means of another keystroke.

It is furthermore proposed that the SSID, the password and/or the name are transmitted to the household appliance by means of the optical code. In order to transmit the optical code, the user holds the user terminal in front of the household appliance in such a way that the screen displaying the optical code can be detected by a corresponding scanning device of the household appliance, preferably by a camera thereof.

According to an embodiment, it is furthermore proposed that the household appliance generates and displays an optical code, wherein the optical code can be scanned by the user terminal. According to this embodiment, the household appliance also features a screen for displaying an optical code, which may likewise be a two-dimensional code, particularly a QR code. The optical code serves for respectively transmitting information on the household appliance to a user of the household appliance or a user terminal of the user. Among other things, bidirectional communication between the household appliance and the user terminal is thereby achieved. It is particularly possible that a dialogue in the form of a mutual data exchange by means of the optical codes precedes an integration of the household appliance into the home network. This data exchange may include, for example, a mutual confirmation as to the fact that the user terminal runs an original application of the manufacturer of the household appliance and that an original household appliance of the respective manufacturer is used. The household appliance and the user terminal exchange original certificates by means of this mutual safety check in order to ensure the network integration, the communication between the components and the control of specific appliance functions.

It would particularly be possible that the household appliance transmits a configuration to be adjusted for the application installed on the user terminal in the optical code. This design particularly allows the control of specific functions of the household appliance. For example, a basic configuration of the application may be adjusted for a certain type of household appliance such that suitable functions in the application are only available for this specific type of household appliance. On the other hand, the household appliance can detect whether a suitable application for the household appliance is available on the user terminal and, if applicable, respectively alert the user of an unsuitable application or reject a connection to the application.

The above-described method can be used in conjunction with different household appliances. The method is particularly suitable for household robots, for example floor treatment robots such as vacuuming robots, wiping robots, polishing robots, mowing robots and the like. The household appliance may furthermore have several of these functions or different functions. It would basically also be conceivable that the household appliance consists of a household appliance, which is manually operated by a user, for example a manually operated vacuum cleaner or the like. The household appliance may furthermore be an attachment for a household appliance, an accessory or the like. The method is particularly suitable for household appliances, which do not feature their own user interface for entering network access information.

BRIEF DESCRIPTION OF THE DRAWINGS

The invention is described in greater detail below with reference to exemplary embodiments. In the drawings:

FIG. 3 shows the household appliance and the user terminal during bidirectional communication.

DESCRIPTION OF THE EMBODIMENTS

Figure 1:
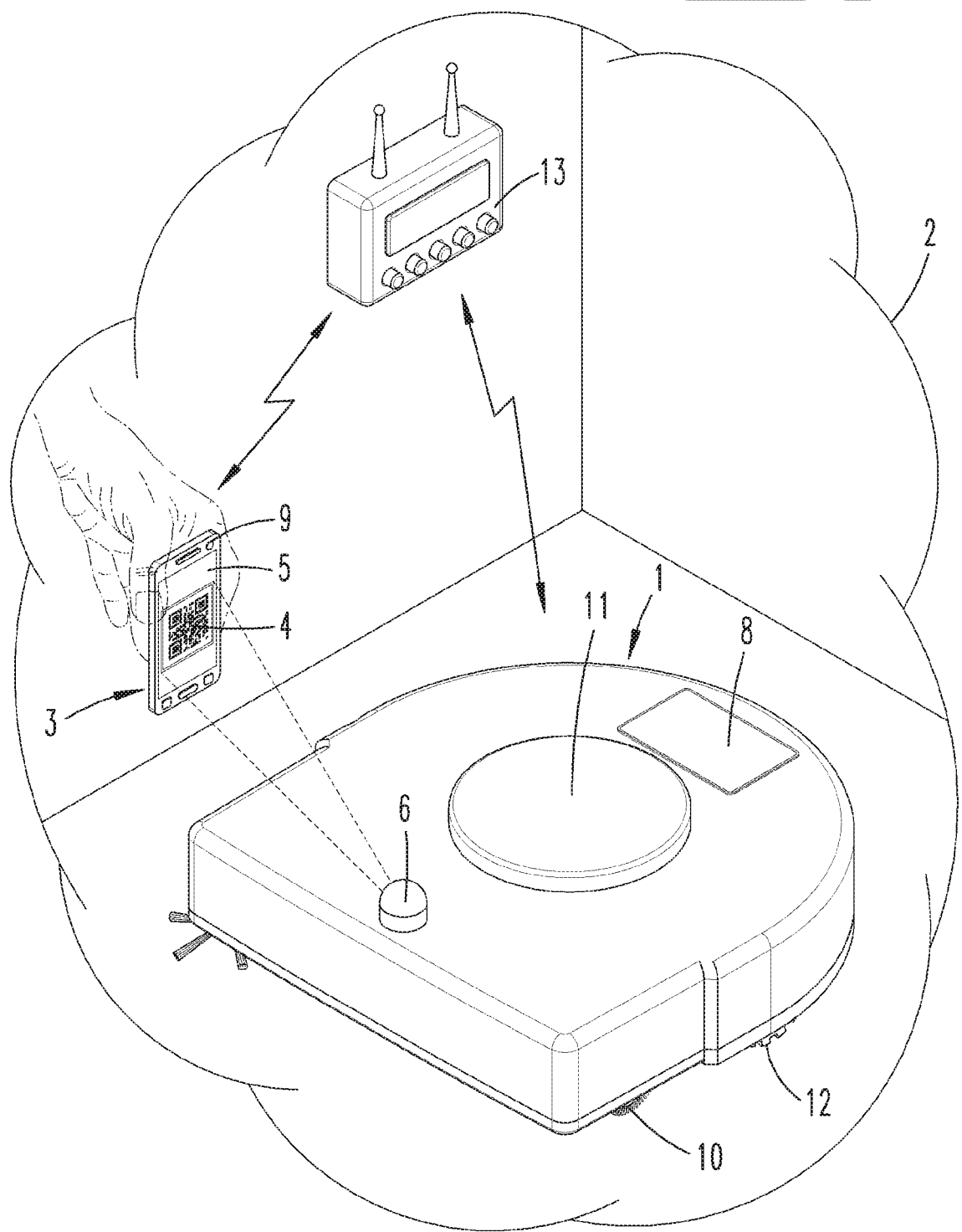
FIG. 1 shows a home network with a household appliance, a user terminal and an access point.

FIG. 1 shows a home network 2 such as, for example, a conventional Wi-Fi network with an access point 13, a household appliance 1 and a user terminal 3. The household appliance 1, the user terminal 3 and the access point 13 feature Wi-Fi modules for communicating with one another. In this case, the household appliance 1 is a self-traveling cleaning apparatus, namely a vacuuming robot. The user terminal 3 is a smartphone.

The household appliance 1 features a not-shown navigation and self-localization device, by means of which the household appliance 1 can orient itself and travel within an environment. The navigation and self-localization device evaluates measuring data of a distance measuring device 11, which in this case consist, for example, of an all-around laser scanner in the form of a laser triangulation system. The distance measuring device 11 measures distances from obstacles and room boundaries. This measuring data is preferably compared with measuring data of an odometry sensor that measures the distance traveled by the household appliance 1. The information on obstacles and room boundaries of the environment is processed into an environment map of the household appliance 1, by means of which the household appliance 1 can orient itself in the environment. The household appliance 1 also features a cleaning element 10 for treating a surface to be cleaned. In this case, the cleaning element 10 consists, for example, of a bristle roller that is driven by an electric motor. The household appliance 1 features multiple motor-driven wheels 12 that serve for the progressive motion of the household appliance 1 within the environment. The household appliance 1 furthermore features an image sensor 6, in this case a camera. In addition, a screen 8 for displaying various information is arranged on an upper side of the household appliance 1.

The user terminal 3 features a screen 5 and an image sensor 6, namely a camera. An optical code 4 in the form of a QR code is displayed on the screen 5 and described in greater detail below.

Figure 2:
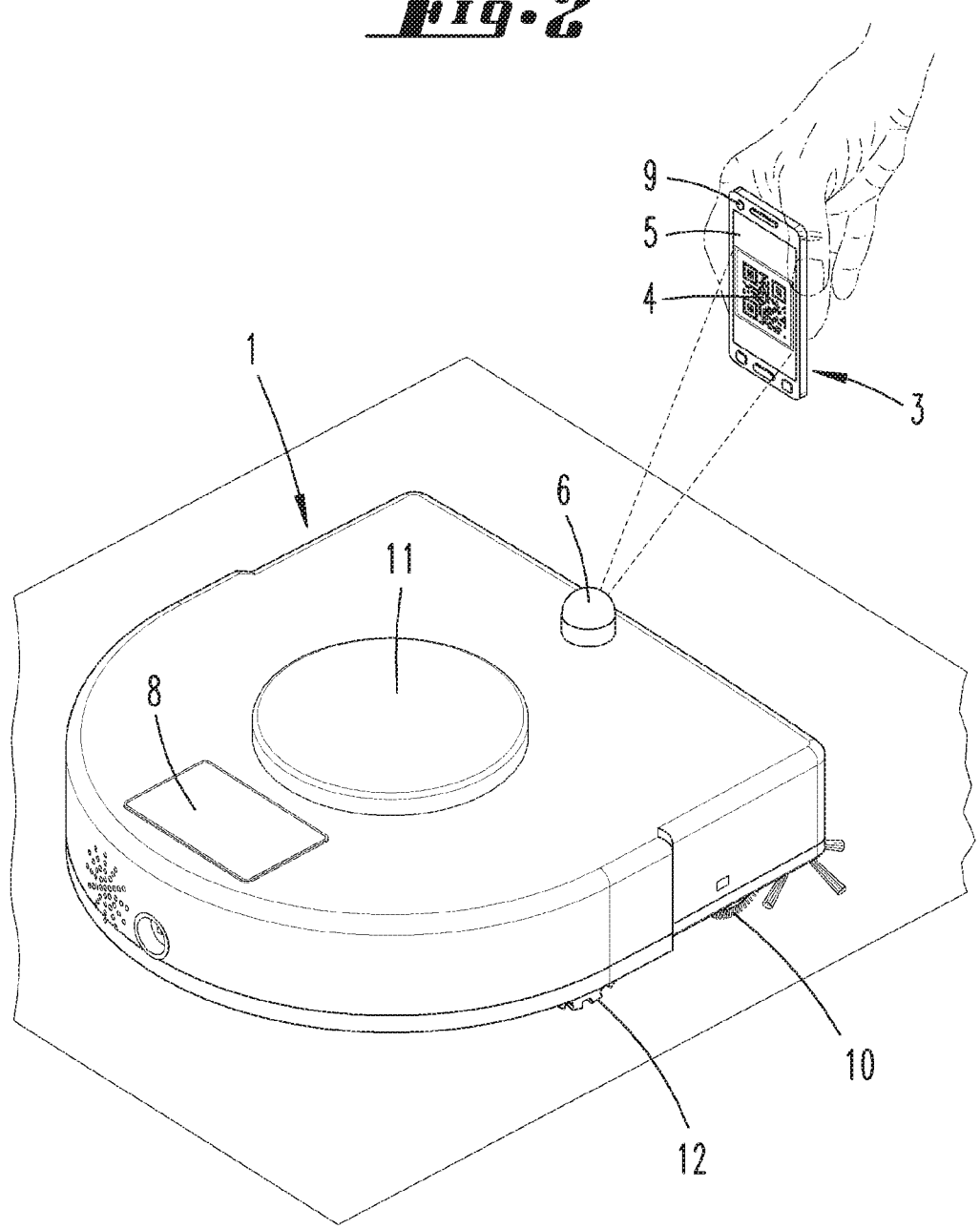
FIG. 2 shows the household appliance and the user terminal during the transmission of an optical code from the user terminal to the household appliance.

FIG. 2 shows the household appliance 1 and the user terminal 3 while an optical code 4 displayed on the screen 5 of the user terminal 3 is scanned by means of the image sensor 6 of the household appliance 1.

FIG. 3 shows the household appliance 1 and the user terminal 3 during bidirectional communication. In this case, an optical code 4 is displayed on the screen 5 of the user terminal 3. An optical code 7 is displayed on the screen 8 of the household appliance 1. The household appliance 1 and the user terminal 3 are positioned relative to one another in such a way that the scanning range of the image sensor 6 of the household appliance 1 contains the screen 5 of the user terminal 3 and the scanning range of the image sensor 9 of the user terminal 3 contains the screen 8 of the household appliance 1.

In order to connect the household appliance 1 to the home network 2, the invention is implemented by initially connecting the user terminal 3 to the access point 13 of the home network 2. For this purpose, the network access information of the access point 13 is usually transmitted to the user terminal 3 via a user interface, for example the screen 5 of the user terminal 3 in this case. In order to also integrate the household appliance 1, which does not feature a user interface, into the home network 2 in this situation, the user terminal 3 transmits the network access information to the household appliance. 1. This requires the installation of an application that serves for the communication with the household appliance 1 on the user terminal 3. The user starts the application and opens an input mask, in which the user enters an SSID of the household appliance 1, an associated password and a name for the household appliance 1. The SSID of the household appliance 1 may be provided by the manufacturer, for example, in the form of an imprint or label on the housing of the household appliance 1. After a confirmation of the entered information by the user, the application generates a QR code, into which the network access information for the home network 2 and an application identification are additionally integrated. The generated QR code is displayed on the screen 5 of the user terminal 3. In order to respectively transmit the optical code 4 or the network access information contained therein to the household appliance 1, the user terminal 3 with the screen 5 is held in front of the image sensor 6 of the household appliance 1 in such a way that the screen 5 protrudes into the scanning range of the image sensor 6. The image sensor 6 detects the presence of an optical code 4 within its scanning range, if applicable after a request for a corresponding scanning function by the user, and scans the optical code 4. The image sensor 6 transmits the optical code 4 to an evaluation device of the household appliance 1, which subsequently evaluates the contents of the optical code 4. In this case, it is initially checked if the SSID and the password match the data stored in the household appliance 1. It is furthermore checked if the application identification contained in the optical code 4 matches an application identification stored in the household appliance 1, i.e. if the application identification is valid. If it is determined that this information matches, the network access information is extracted from the optical code 4. Subsequently, the household appliance 1 can log on to the access point 13 of the home network 2 with the aid of this network access information.

FIG. 3 shows bidirectional communication between the household appliance 1 and the user terminal 3. In this case, data is transmitted from the user terminal 3 to the household appliance 1, as well as from the household appliance 1 to the user terminal 3, simultaneously or in rapid succession. In this embodiment, for example, the user terminal 3 displays an optical code 4 on its screen 5 as already described above with reference to Figures of 1 and 2, wherein said optical code contains an SSID, a password and a name of the household appliance 1, network access information for logging on to the home network 2, as well as an application identification of the application installed on the user terminal 3. In this case, the optical code 4 is also a QR code. With respect to the household appliance 1, a control device of the household appliance 1 likewise generates an optical code 7, which is subsequently displayed on the screen 8 of the household appliance 1. For example, the optical code 7 contains a basic configuration to be adjusted for an application installed on the user terminal 3. The household appliance 1 thereby transmits information, for example, on suitable functions of the application for the specific type of household appliance 1.

This bidirectional communication furthermore makes it possible to exchange original certificates of the user terminal 3 and the household appliance 1 by means of the optical codes 4, 7 such that a network integration, a communication between the components and a control of the specific appliance functions are ensured. In this case, the household appliance 1 can also determine whether a suitable application for this specific household appliance 1 is installed on the user terminal 3 based on the application identification encoded in the optical code 4 of the user terminal 3. If applicable, the household appliance 1 may otherwise transmit information referring to an unsuitable application to the user. This reference may be displayed, for example, on the screen 8 of the household appliance 1 or initially transmitted to the user terminal 3 and then relayed from the user terminal to the user.

LIST OF REFERENCE SYMBOLS

1 Household appliance
2 Home network
3 User terminal
4 Optical code
5 Screen
6 Image sensor
7 Optical code
8 Screen
9 Image sensor
10 Cleaning element
11 Distance measuring device
12 Wheel
13 Access point

The invention claimed is:

1. A method for connecting a household appliance (1) to a wireless home network (2), wherein network access information indicating the wireless home network is transmitted from a user terminal (3) in the form of a mobile telephone, a laptop or tablet computer to the household appliance (1) by means of an optical code (4) displayed on the user terminal (3), wherein the user places the user terminal (3) in front of an image sensor (6) of the household appliance (1), and wherein the household appliance (1) logs on to the wireless home network (2) by utilizing the received network access information, wherein a user starts an application installed on the user terminal (3) and enters access data indicating the household appliance (1), wherein the application generates the optical code (4), into which the access data indicating the household appliance (1), the network access information indicating the home network (2) and an application identification indicating the application are integrated, wherein the application identification comprises an information about a version of the application, wherein the optical code (4) is transmitted to the household appliance (1), and wherein the household appliance (1) compares the access data indicating the household appliance (1), as well as the application identification, contained in the optical code (4) with data stored in the household appliance (1), as well as an application identification stored in the household appliance (1), and in case of a match extracts the network access information indicating the wireless home network (2) from the optical code (4), wherein an evaluation device of the household appliance (1) determines on the basis of the application identification contained in the optical code if the optical code (4) is suitable for this household appliance (1), in order to prohibit a non-suitable application from leading to a malfunction or failure of a registration process for logging on the household appliance (1) to the home network (2), wherein the household appliance (1) generates and displays a further optical code (7), wherein the further optical code (7) is scanned by the user terminal (3) and comprises information on the household appliance (1), wherein a bidirectional communication is performed between the household appliance (1) and the user terminal (3) prior to an integration of the household appliance (1) into the wireless home network (2), wherein a mutual confirmation is performed that includes a confirmation that the user terminal (3) runs an original application of the manufacturer of the household appliance (1) and a confirmation that an original household appliance (1) of the respective manufacturer is used, thereby exchanging original certificates by means of the mutual confirmation and wherein the household appliance (1) transmits a basic configuration to be adjusted for the application installed on the user terminal (3) in the further optical code (7), wherein the basic configuration comprises information on control of specific floor treatment functions of the application for the specific type of household appliance.

2. The method according to claim 1, wherein the evaluation device of the household appliance (1) compares the application identification contained in the optical code (4) with the application identification stored in the household appliance (1) and uses the network access information contained in the optical code (4) for logging on to the home network (2) if the application identifications match.

3. The method according to claim 2, wherein the information contained in the optical code (4) is not used by the household appliance (1) if the application identification does not match or is missing.

4. The method according to claim 1, wherein the optical code (4) is a two-dimensional code displayed on a screen (5) of the user terminal (3), particularly a QR code(R) (Quick Response code).

5. The method according to claim 1, wherein the optical code (4) is scanned by means of an image sensor (6) of the household appliance (1).

6. The method according to claim 1, wherein the user selects an SSID of the household appliance (1) and/or specifies a password for the household appliance (1) and/or specifies a name for the household appliance (1) by means of the application installed on the user terminal (3).

7. The method according to claim 6, wherein the SSID, the password and/or the name are transmitted to the household appliance (1) by means of the optical code (4).

* * * * *